United States Patent [19]

Suzuki

[11] 4,431,079
[45] Feb. 14, 1984

[54] FOUR-WHEEL VEHICLE DRIVE SYSTEM

[75] Inventor: Kunihiko Suzuki, Yokohama, Japan

[73] Assignee: Nissan Motor Company, Limited, Yokohama, Japan

[21] Appl. No.: 368,680

[22] Filed: Apr. 14, 1982

[30] Foreign Application Priority Data

Apr. 30, 1981 [JP] Japan .................. 56-66288

[51] Int. Cl.³ ............................................. B60K 17/34
[52] U.S. Cl. ..................................... 180/233; 74/695; 180/247; 180/297
[58] Field of Search ............... 180/233, 247, 248, 249, 180/250, 297; 74/694, 695, 700, 701, 785

[56] References Cited

U.S. PATENT DOCUMENTS

| | | | |
|---|---|---|---|
| 2,595,494 | 5/1952 | Stratman | 180/49 |
| 2,882,752 | 4/1959 | Russell | 74/785 |
| 3,113,471 | 12/1963 | Gregory | 74/701 |
| 3,265,173 | 8/1966 | Russell | 192/67 |
| 3,350,960 | 11/1967 | Lamburn et al. | 74/701 |
| 3,378,093 | 4/1968 | Hill | 180/44 |
| 3,557,634 | 1/1971 | Bixby | 74/710.5 |
| 3,889,771 | 6/1975 | Kronogard | 180/44 R |
| 3,895,546 | 7/1975 | Yamaguchi et al. | 74/695 |
| 3,993,152 | 11/1976 | Fogelberg | 180/44 R |
| 4,074,591 | 2/1978 | Dick | 74/674 |
| 4,208,923 | 6/1980 | Ikegami | 74/15.63 |

FOREIGN PATENT DOCUMENTS

| | | |
|---|---|---|
| 491645 | 9/1938 | United Kingdom . |
| 887849 | 1/1962 | United Kingdom . |
| 2064449 | 6/1981 | United Kingdom . |
| 2074516 | 11/1981 | United Kingdom . |
| 2074517 | 11/1981 | United Kingdom . |
| 2075933 | 11/1981 | United Kingdom . |

Primary Examiner—John A. Pekar
Assistant Examiner—D. Lynn Fugate
Attorney, Agent, or Firm—Lane, Aitken & Kananen

[57] ABSTRACT

A four-wheel vehicle drive system comprising a power unit having an output shaft in a lateral direction of the vehicle; a transmission gear unit having input and output shafts parallel with an extension of the axis of rotation of the output shaft of the power unit; a power transfer gear rotatable about an axis parallel with the transmission input and output shafts and driven by the transmission output shaft; a first wheel drive unit comprising a differential gear assembly for one first pair of road wheels and a planetary gear assembly having a first rotary member driven by the transfer gear, a second rotary member driving the differential gear assembly and a third rotary member; low-and-high speed shifting clutch means to provide coupling selectively between the power transfer gear and the third rotary member and between the third rotary member and a stationary member fixed in the vehicle; a second wheel drive unit wherein the driving power transmitted to the second rotary member is split into two components, one of which is carried to the differential gear assembly and the other of which is carried to a driven gear rotatable about an axis in a fore-and-aft direction of the vehicle; a driveline intervening between the driven gear and another pair of road wheels; and two-wheel/four-wheel drive shifting means intervening between the driven gear and the driveline.

10 Claims, 6 Drawing Figures

FOUR-WHEEL VEHICLE DRIVE SYSTEM

FIELD OF THE INVENTION

The present invention relates to four-wheel drive system for a vehicle having at least two pairs of road wheels consisting of a pair of front road wheels and a pair of rear road wheels and, more particularly, to a four-wheel drive system for such a wheeled vehicle.

SUMMARY OF THE INVENTION

In accordance with the present invention, there is provided a four-wheel drive system for a vehicle having at least two pairs of road wheels consisting of a first pair of road wheels and a second pair of road wheels, comprising a power unit having an output shaft rotatable about an axis in a lateral direction of the vehicle; a power transmission gear unit including transmission input and output shafts each having an axis of rotation parallel with an extension of the axis of rotation of the output shaft of the power unit; a power transfer gear rotatable about an axis parallel with the respective axes of the transmission input and output shafts, the transmission output shaft being held in driving engagement with the power transfer gear; a first wheel drive unit comprising a differential gear assembly for the first pair of road wheels; a planetary gear assembly comprising at least three rotary members consisting of first, second and third rotary members having a common axis of rotation parallel with the axis of rotation of the power transfer gear, each of the three rotary members being constituted by any of an externally toothed sun gear, an internally toothed ring gear coaxially encircling the sun gear and a pinion carrier carrying at least one planet pinion held in mesh with the sun gear and the ring gear and rotatable with respect to the pinion carrier about an axis parallel with the above mentioned common axis, the power transfer gear being in driving engagement with the first rotary member of the planetary gear assembly, the second rotary member of the planetary gear assembly being held in driving engagement with the differential gear assembly; low-and-high speed shifting clutch means adapted to provide coupling selectively between the power transfer gear and the third rotary member of the planetary gear assembly and between the third rotary member and a stationary member fixed in the vehicle; a second wheel drive unit comprising right-angle power transfer gear means with which the second rotary member is held in driving engagement so that the driving power transmitted to the second rotary member is split into two components, one of which is to be carried to the differential gear assembly and the other of which is to be carried to the right-angle power transfer gear means, the right-angle power transfer gear means including a driven gear rotatable about an axis in a fore-and-aft direction of the vehicle; a driveline operatively intervening between the driven gear and the second pair of road wheels; and two-wheel/four-wheel drive shifting means intervening between the planetary gear assembly and the driveline and operative to selectively provide coupling therebetween.

DESCRIPTION OF THE DRAWINGS

The features and advantages of the four-wheel drive system according to the present invention will be more clearly understood from the following description in which like reference numerals and characters designate corresponding or similar members and structures throughout the figures of the drawings and in which.

DESCRIPTION OF THE PRIOR ART

Figure 1:
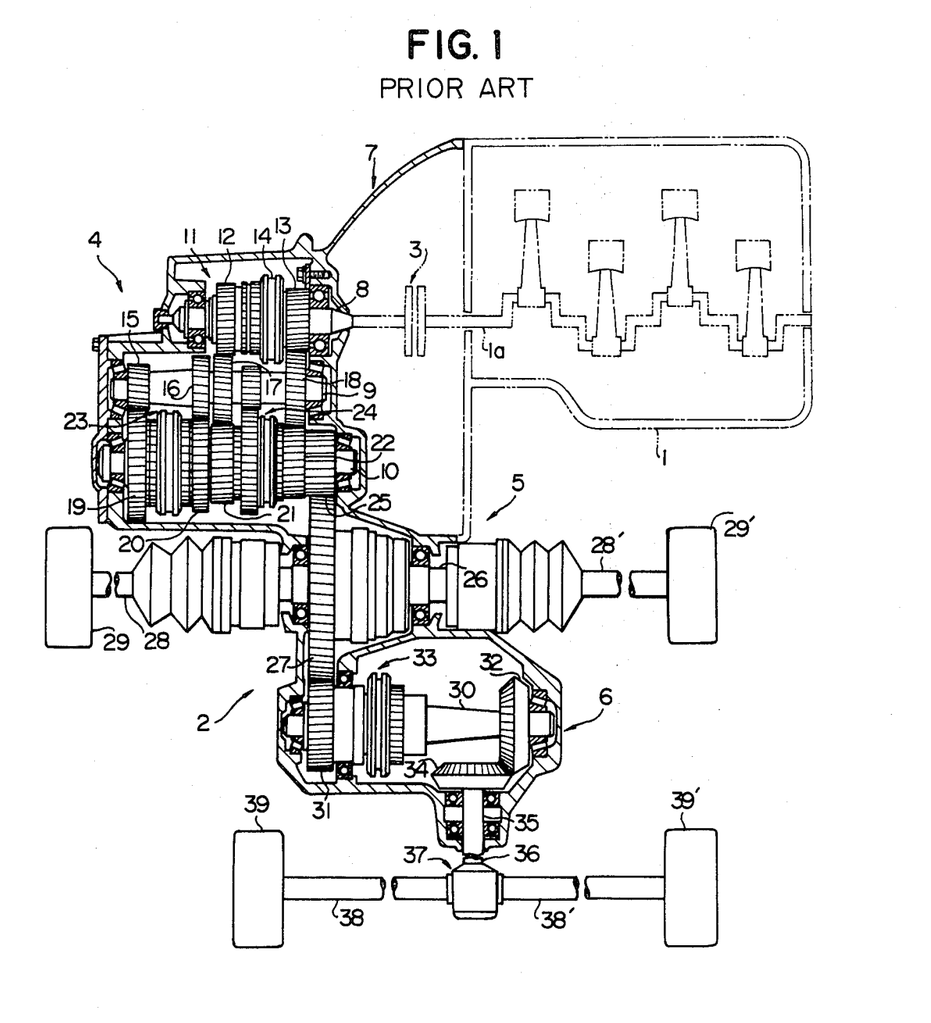
FIG. 1 is a plan view showing, in part schematically, an example of the prior-art four-wheel vehicle drive system of the nature to which the present invention generally relates.

Referring to FIG. 1 of the drawings, a prior-art four-wheel-drive system of the nature to which the present invention generally appertains comprises an internal combustion engine 1 having a crankshaft 1a. The engine 1 is installed in a front portion of the vehicle body (not shown) and is positioned in such a manner that the crankshaft 1a extends in a lateral direction of the vehicle body. The prior-art four-wheel-drive system further comprises a transaxle mechanism 2 which includes a clutch unit 3, a power transmission gear unit 4, a front-wheel differential gear unit 5, and a rear-wheel drive unit 6, the units 3, 4, 5 and 6 being enclosed within a transaxle casing 7. The transmission gear unit 4 includes an input shaft 8 having opposite end portions respectively jounaled in the transaxle casing 7 and extending in alignment with the axis of rotation of the engine crankshaft 1a. The transmission input shaft 8 is selectively coupled to and uncoupled from the crankshaft 1a of the engine 1 through the clutch unit 3. The transmission gear unit 4 includes, in addition to the above mentioned input shaft 8, intermediate and output shafts 9 and 10 which extend in parallel with the input shaft 8 and each of which also has opposite end portions respectively jounaled in the transaxle casing 7. The transmission input shaft 8 has carried thereon a low-high speed shift mechanism 11 which is composed of high-speed and low-speed input gears 12 and 13 rotatable on the shaft 8 and a high-low speed shift synchronizer clutch assembly 14 which axially intervenes between the input gears 12 and 13.

On the other hand, the transmission intermediate shaft 9 has carried thereon a set of gears including first-speed, second-speed, third-speed and fourth-speed intermediate gears 15, 16, 17 and 18 and, likewise, the transmission output shaft 10 has carried thereon a set of gears including first-speed, second-speed, third-speed and fourth-speed output gears 19, 20, 21 and 22 which are held in mesh with the first-speed, second-speed, third-speed and fourth-speed intermediate gears 15, 16, 17 and 18, respectively, on the transmission input shaft 8. The third-speed and fourth-speed intermediate gears 17 and 18 in particular are held in mesh also with the high-speed and low-speed input gears 12 and 13, respectively, on the input shaft 8 as shown. The gears 15, 16, 17 and 18 on the transmission intermediate shaft 9 are rotatable with the shaft 9, while the gears 19, 20, 21 and 22 on the transmission output shaft 10 are rotatable on the shaft 10. The transmission output shaft 10 has further carried thereon a first-second speed shift synchronizer clutch assembly 23 which axially intervenes between the first-speed and second-speed output gears 19 and 20, and a third-fourth speed shift synchronizer clutch assembly 24 which axially intervenes between the third-speed and fourth-speed output gears 21 and 22.

The transmission output shaft 10 has further carried thereon a drive gear 25 which is fixedly mounted on an end portion of the shaft 10 and which is thus rotatable with the shaft 10. On the other hand, the front-wheel differential gear unit 5 includes a shaft 26 extending in parallel with the shafts 8, 9 and 10 of the transmission gear unit 4 and having axial portions respectively journaled in the transaxle casing 7. The shaft 26 has securely carried thereon a ring gear 27 held in mesh with the above mentioned drive gear 25 and is connected at the opposite axial ends thereof to front wheel drive shafts 28 and 28'. The front wheel drive shafts 28 and 28' in turn are coupled at their outer axial ends to front wheel axles for front road wheels 29 and 29', respectively. Furthermore, the rear-wheel drive unit 6 provided in the transaxle casing 7 includes a power transfer shaft 30 also extending in parallel with the shafts 8, 9 and 10 of the transmission gear unit 4 and having axial portions respectively journaled in the transaxle casing 7. The power transfer shaft 30 has carried thereon a transfer gear 31 which is rotatable on the shaft 30 and which is held in mesh with the ring gear 27 on the above mentioned shaft 26 as shown. The power transfer shaft 30 has further carried thereon a drive bevel gear 32 which is fixedly mounted on a leading end portion of the shaft 30 and which is thus rotatable with the shaft 30. The power transfer shaft 30 has further mounted thereon a two-wheel/four-wheel drive selector clutch assembly 33 by means of which the transfer gear 31 is selectively coupled to and uncoupled from the shaft 30. The bevel gear 32 on the power transfer shaft 30 is held in mesh with a driven bevel gear 34 rotatable with a drive shaft 35 extending in a fore-and-aft direction of the vehicle body. The drive shaft 35 has axial end portions respectively journaled in the transaxle casing 7 and is coupled at its rear end to a propeller shaft 36. The propeller shaft 36 in turn is linked at its rear end to a rear-wheel differential gear unit 37 including a pair of side gear shafts (not shown) coupled though rear-wheel drive shafts 38 and 38' to rear wheel axles of rear road wheels 39 and 39', respectively.

A problem has been encountered in a prior-art four-wheel drive system of the nature above described. The problem stems from the fact that the transmission gear unit 4 of the system includes a total of three shafts including the shaft used to have the high-speed and low-speed input gears 12 and 13 carried thereon. The provision of the three parallel shafts 8, 9 and 10 results in an increase in the fore-and-aft dimension of the transaxle casing 7 and accordingly in an increase in the overall fore-and-aft length of the vehicle body which is required to provide an extra space for the accommodation of such a large-sized transaxle casing 7. The present invention contemplates elimination of such a problem.

DESCRIPTION OF THE EMBODIMENTS

Figure 2:
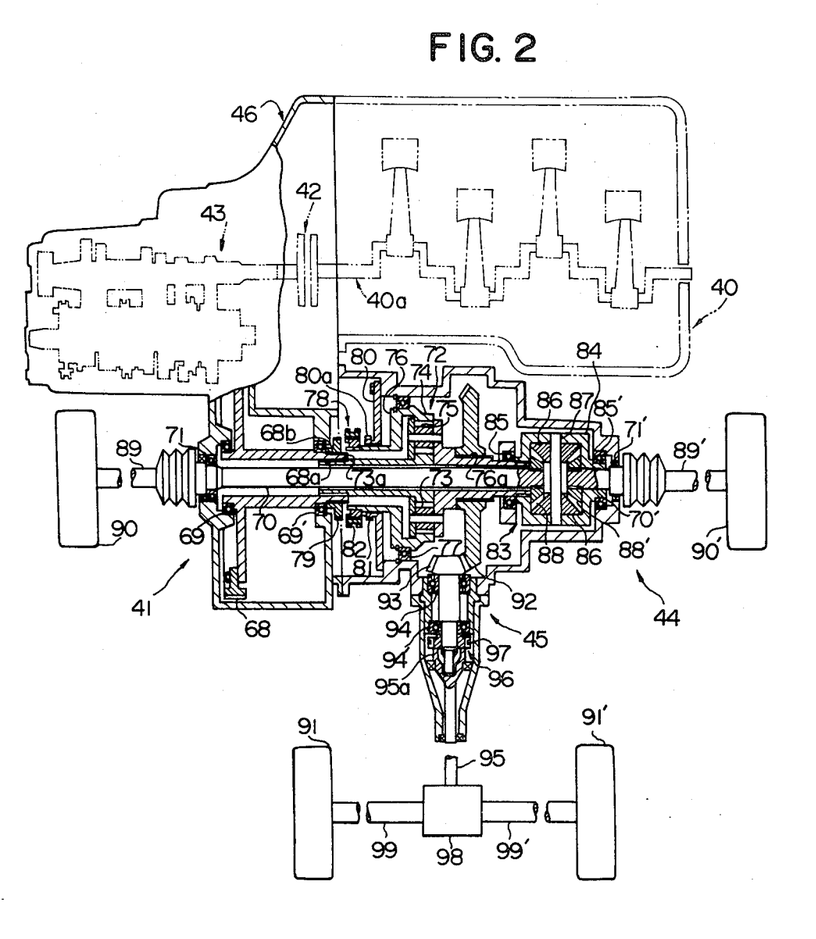
FIG. 2 is a schematic view showing the general construction and arrangement of a first embodiment of a four-wheel drive system according to the present invention.

Referring to FIG. 2, a four-wheel drive system embodying the present invention comprises a power unit which is usually constituted by an internal combustion engine 40 having a power output shaft 40a which is constituted by, for example, the crankshaft of an ordinary internal combustion engine. The four-wheel drive system proposed by the present invention is intended for use in an automotive vehicle of the type having the engine positioned laterally of the vehicle body. The engine 40 herein shown is thus installed on the body structure (not shown) of a wheeled vehicle in such a manner that the engine output shaft 40a thereof extends in a lateral direction of the vehicle body. The four-wheel drive system embodying the present invention is further assumed, by way of example, as being of the front-engine design and, thus, the engine 40 is positioned in a front portion of the vehicle body.

Figure 3:
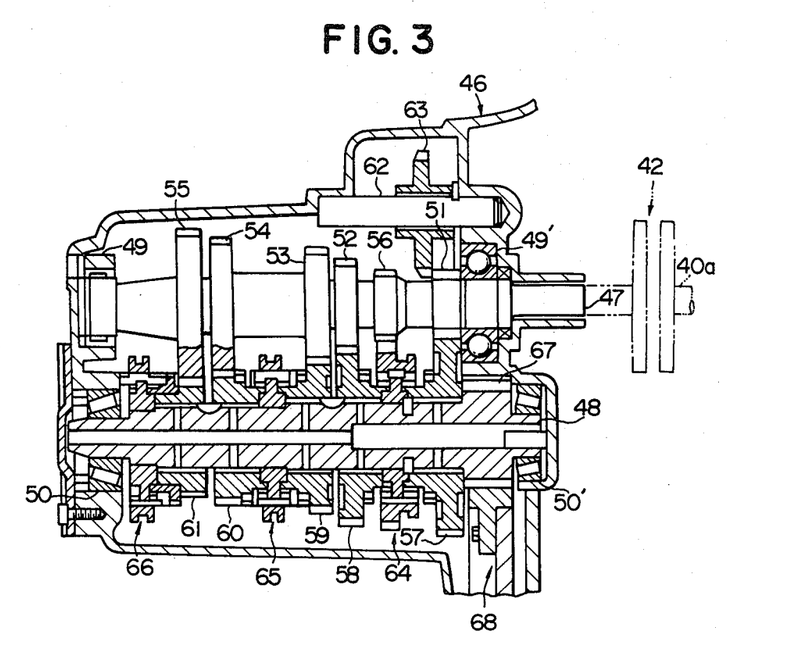
FIG. 3 is a sectional view showing, to an enlarged scale, a power transmission gear unit forming part of each of the embodiments of the system according to the present invention.

The four-wheel drive system embodying the present invention further comprises a manually operated transmission-front-axle or, briefly, transaxle mechanism 41 which includes a mechanical clutch unit 42, a manually operated power transmission gear unit 43, a power transfer gear 68, a front-wheel drive unit 44, a planetary gear assembly 72 and a rear-wheel drive gear unit 45. As shown in FIG. 3, the transmission gear unit 43 comprises input and output shafts 47 and 48. The input shaft 47 has opposite axial end portions respectively jounaled in bearings 49 and 49' received in the transaxle casing 46 and extending in alignment with the axis of rotation of the engine output shaft 40a. The transmission output shaft 48 likewise has opposite axial end portions respectively jounaled in bearings 50 and 50' received in the transaxle casing 46 and extending in parallel with the transmission input shaft 47. The transmission input shaft 47 is selectively coupled to and uncoupled from the output shaft 40a of the engine 40 through the clutch unit 42 as is customary.

The power transmission gear unit 43 is assumed, by way of example, as being of the five-forward-speed and one-reverse-speed type and comprises, as shown to an enlarged scale in FIG. 3, six input gears rotatable with the transmission input shaft 47 and axially spaced apart from each other on the shaft 47. The gears are fixedly mounted on or integral with the shaft 47 and consist of first-speed, second-speed, third-speed, fourth-speed and fifth-speed forward drive gears 51 to 55, and a reverse drive gear 56. On the other hand, the transmission output shaft 48 has mounted thereon five driven gears which are axially spaced apart from each other on the shaft 48 and which are rotatable independently of one another on the shaft 48. The driven gears consist of first-speed, second-speed, third-speed, fourth-speed and fifth-speed driven gears 57 to 61. The first-speed to fifth-speed driven gears 57 to 61 on the transmission output shaft 48 are held in mesh with the first-speed to fifth-speed drive gears 51 to 55, respectively, on the transmission input shaft 47. The transmission gear unit 43 further comprises a reverse idler shaft 62 having a reverse idler gear 63 rotatably mounted thereon. The reverse idler shaft 62 also extends axially in parallel with the transmission input shaft 47 and has opposite axial end portions secured to the transaxle casing 46.

The transmission gear unit 43 is further assumed as being of the fully synchronized type and comprises three synchronizer clutch assemblies each of which is rotatable with the transmission output shaft 48. The synchronizer clutch assemblies consist of a first-second speed synchronizer clutch assembly 64, a third-fourth speed synchronizer clutch assembly 65, and a fifth speed synchronizer clutch assembly 66. The first-second speed synchronizer clutch assembly 64 axially intervenes between the first-speed and second-speed driven gears 57 and 58 and is selectively engageable with these gears 57 and 58. Likewise, the third-fourth speed synchronizer clutch assembly 65 axially intervenes between the third-speed and fourth-speed driven gears 59 and 60 and is selectively engageable with the gears 59 and 60. On the other hand, the fifth-speed synchronizer clutch assembly 66 is provided in association with the fifth-speed driven gear 61 and is engageable with the gear 61. The reverse idler gear 63 on the idler shaft 62 is operable to intervene between the reverse drive gear 56 on the transmission input shaft 47 and the first-second speed synchronizer clutch assembly 64.

The transmission output shaft 48 has fixedly mounted thereon a transmission output gear 67 which is thus rotatable with the transmission output shaft 48 about the axis of the shaft 48. Turning back to FIG. 2, the transmission output gear 67 is held in mesh with the above mentioned power transfer gear 68 which is rotatable with respect to the transaxle casing 46 about an axis parallel with the axis of rotation of the transmission output shaft 48. The power transfer gear 68 has an axial boss portion journaled in a bearing 69 and a hollow axial extension having an end portion journaled in a bearing 69', each of the bearings 69 and 69' being received in the transaxle casing 46. The hollow axial extension of the power transfer gear 68 has serrated inner and outer peripheral portions 68a and 68b as shown.

The front-wheel drive unit 44 comprises a pair of side gear shafts 70 and 70' extending in parallel with the input and output shafts 47 and 48 of the transmission gear unit 43 and having axially outer end portions journaled in bearings 71 and 71', respectively, which are received in the transaxle casing 46. The side gear shafts 70 and 70' have a common axis of rotation which is in part coincident with the axis of rotation of the power transfer gear 68 and which is thus parallel with the input and output shafts 47 and 48 (FIG. 3) of the transmission gear unit 43.

The planetary gear assembly 72 is shown as coaxially surrounding an axial portion of one of the side gear shafts such as the side gear shaft 70. The planetary gear assembly 72 comprises an axially bored, externally toothed sun gear 73 coaxially surrounding an axial portion of the side gear shaft 70, an internally toothed ring gear 74 coaxially encircling the sun gear 73 and two or more planet pinions 75 each intervening between the sun gear 73 and the ring gear 74. The sun gear 73 is rotatable about an axis aligned with the axis of rotation of the power transfer gear 68 and is formed with an axial bore. Each of the planet pinions 75 is rotatable about an axis parallel with the axis of rotation of the sun gear 73 and is held in mesh with both of the sun gear 73 and the ring gear 74. The planet pinions 75 are connected together by means of a pinion carrier 76 which is rotatable about the common axis of rotation of the sun gear 73 and the ring gear 74. The planet pinions 75 are, thus, not only rotatable individually about the respective axes of rotation thereof with respect to the pinion carrier 75 but revolvable together about the common axis of rotation of the sun and ring gears 73 and 74 with respect to the transaxle casing 46. The ring gear 74 is rotatably supported in the transaxle casing 46 by suitable bearings 77 received in the casing 46 as shown. The sun gear 73 has a hollow axial extension coaxially surrounding an axial portion of the side gear shaft 70 and axially extending toward the axial extension of the power transfer gear 68. The axial extension of the sun gear 73 has a serrated outer peripheral portion 73a projecting into and splined to the serrated inner peripheral portion 68a of the axial extension of the power transfer gear 68. The sun gear 73 is, accordingly, rotatable with the power transfer gear 68 about the center axis of the side gear shaft 70. The pinion carrier 76 of the planetary gear assembly 72 likewise has a hollow axial extension formed with an externally serrated outer peripheral portion 76a and coaxially surrounding an axial portion of the side gear shaft 70.

The front-wheel drive unit 44 further comprises a low-and-high speed shifting clutch means 78 adapted to have the ring gear 74 of the planetary gear assembly 72 coupled selectively to the above described power transfer gear 68 and to the transaxle casing 46. For this purpose, the low-and-high speed shifting clutch means 78 comprises at least three clutch elements consisting of a first clutch element rotatable with the power transfer gear 68, a second clutch element secured to the transaxle casing 46, and a third clutch element rotatable with the ring gear 74 of the planetary gear assembly 72 and selectively engageable with the first and second clutch elements. The three clutch elements are arranged in series in coincidence with the side gear shaft 70 with the third clutch element located between the first and second clutch elements and arranged to be axially movable selectively into engagement with the first clutch element or the second clutch element. In the arrangement shown in FIG. 2, the first clutch element is constituted by an externally serrated annular member 79 having a serrated inner peripheral portion splined to the previously mentioned serrated outer peripheral portion 68b of the axial extension of the power transfer gear 68. The second clutch element is constituted by a reaction member 80 screwed, bolted or otherwise fixedly attached to the transaxle casing 46 and formed with a circular opening allowing the hollow axial extension of the ring gear 74 to axially extend therethrough toward the axial extension of the power transfer gear 68. The reaction member 80 has an externally serrated annular portion 80a coaxial with the side gear shaft 70. The axial extension of the ring gear 74 has fixedly mounted on its outer peripheral surface an externally serrated annular sleeve carrier member 81 to which an internally serrated coupling sleeve 82 is splined. The sleeve carrier member 81 is located axially between the externally serrated annular portion 80a of the reaction member 80 and the externally serrated annular member 79 so that the coupling sleeve 82 is axially movable on the sleeve carrier member 81 in a first direction into engagement with the externally serrated annular portion 80a of the reaction member 80 and in a second direction into engagement with the externally serrated annular member 79. The coupling sleeve 82 thus constitutes the above mentioned third clutch element of the low-and-high speed shifting clutch means 78.

The side gear shafts 70 and 70' axially extend in opposite directions laterally of the vehicle body from a front-wheel differential gear assembly 83 which forms part of the front-wheel drive unit 44 and which is thus also enclosed within the transaxle casing 46. As shown in FIG. 2, the differential gear assembly 83 comprises a differential gear casing 84 which is rotatable about an axis aligned with the common axis of rotation of the sun and ring gears 73 and 74 of the planetary gear assembly 72. The gear casing 84 has opposite axial boss portions respectively journaled in bearings 85 and 85' received in the transaxle casing 46 and has carried therein a pair of differential bevel pinions 86 which are rotatably mounted on common pinion cross shaft 87 secured to the gear casing 84 and extending at right angles to the axis of rotation of the gear casing 84. The individual bevel pinions 86 are, thus, rotatable not only together with the gear casing 84 and cross shaft 87 about the axis of rotation of the gear casing 84 but also independently of one another about the center axis of the cross shaft 87, viz., an axis perpendicular to the axis of rotation of the gear casing 84. The gear casing 84 has one of its axial boss portions internally serrated and splined to the serrated outer peripheral portion 73a of the axial extension of the sun gear 73 of the planetary gear assembly 72. The differential gear casing 84 is thus rotatable about the axis of rotation thereof together with the pinion carrier 76.

The differential bevel pinions 86 intervene between and are held in mesh with a pair of differential side bevel gears 88 and 88' which are also carried in the differential gear casing 84 and which are rotatable about the axis of rotation of the gear casing 84. The side bevel gears 88 and 88' are fixedly connected to or splined to axially inner end portions of the side gear shafts 70 and 70', respectively, extending from the gear casing 84 in a lateral direction of the vehicle body. One side gear shaft 70 axially extends outwardly from the differential gear casing 84 in part through the axial bore in the sun gear 73 and the axial bore in the tubular extension of the pinion carrier 76 and in part through the axial bore in the axial extension of the power transfer gear 68. The other side gear shaft 70' axially extends outwardly from the gear casing 84 in the opposite direction to the side gear shaft 70. The side gear shafts 70 and 70' form part of front axle assemblies and are operatively connected at their axially outer ends to front wheel drive shafts 89 and 89', respectively. The front wheel drive shafts 89 and 89' also extend in a lateral direction of the vehicle body and are connected at their outer axial ends to the front wheel axles (not shown) for front road wheels 90 and 90', respectively.

The planetary gear assembly 72 serves to split the driving power from the power transfer gear 68 into two driving power components. One of the two driving power components is transmitted to the respective wheel axles for the front road wheels 90 and 90' and the other of the power components is to be transmitted through the previously mentioned rear-wheel drive unit 45 to a rear-wheel driveline which terminates in the wheel axles for rear road wheels 91 and 91'. The rear-wheel drive unit 45 is enclosed within a rear extension of the transaxle casing 46 and comprises right-angle power transfer gear means operative to transmit the other of the above mentioned driving power components to the rear-wheel driveline in a fore-and-aft direction of the vehicle body. In the rear-wheel drive unit 45 of the embodiment shown in FIG. 2, such right-angle power transfer gear means is constituted by the combination of a driving bevel gear 92 and a driven bevel gear 93. The driving bevel gear 92 has a serrated inner peripheral wall splined to the serrated outer peripheral portion 76a of the axial extension of the pinion carrier 76 and is rotatable with the pinion carrier 76 about the center axis of the side gear shaft 70. The driven bevel gear 93 is held in mesh with the driving bevel gear 92 and has a rearward axial extension journaled in bearings 94 and 94' received in the rear extension of the transaxle casing 46. The driven bevel gear 93 is rotatable about an axis extending at right angles to the axis of rotation of the driving bevel gear 92, viz., in a fore-and-aft direction of the vehicle body.

The axial extension of the driven bevel gear 93 projects rearwardly from the rear extension of the transaxle casing 46 through an opening formed in the rear extension thereof for connection to a propeller shaft 95 also extending rearwardly from the gear 93 in a fore-and-aft direction of the vehicle body. The driven bevel gear 93 is selectively connected to and disconnected from the propeller shaft 95 by two-wheel/four-wheel drive shifting clutch means 96. The clutch means 96 comprises at least three clutch elements consisting of a first clutch element rotatable with the driven bevel gear 93, a second clutch element rotatable with the propeller shaft 95 and a third clutch element rotatable with one of the first and second clutch elements and selectively movable into and out of engagement with the other of the first and second clutch elements. In the arrangement shown in FIG. 2, the axial extension of the driving bevel gear 93 has a serrated outer peripheral portion while the propeller shaft 95 has adjacent the rear end of the axial extension of the driven bevel gear 93 an externally serrated front end portion 95a. The respective serrated portions of the bevel gear 93 and the propeller shaft 95 constitute the first and second clutch elements, respectively, of the clutch means 96. On the other hand, the third clutch element of the clutch means 96 is constituted by an internally serrated coupling sleeve 97 which is splined to, for example, the serrated outer peripheral portion of the axial extension of the bevel gear 93. The coupling sleeve 97 is axially movable on the serrated outer peripheral portion of the axial extension of the bevel gear 93 in a first direction into engagement with the end portion 95a of the propeller shaft 95 and in a second direction out of the engagement with the portion 95a. The propeller shaft 95 forms part of a driveline for the rear road wheels 91 and 91' and is rearwardly connected to a rear-wheel differential gear assembly 98. The differential gear assembly 98 is per se constructed similarly to the previously described differential gear assembly 83 of the front-wheel drive unit 44. Thus, the gear assembly 98 includes side bevel gears respectively connected to rear-wheel drive shafts 99 and 99' which extend also in a lateral direction of the vehicle body and are connected at their outer axial ends to the rear wheel axles (not shown) for the rear road wheels 91 and 91', respectively.

Description will now be made regarding the operation of the four-wheel drive system constructed and arranged as hereinbefore described wih reference to FIGS. 2 and 3.

When the engine 40 is in operation and the clutch unit 42 is in a coupled condition, the driving power delivered from the output shaft 40a of the engine 40 is transmitted through the clutch unit 42 to the input shaft 47 of the power transmission gear unit 43. If, under these conditions, one of the driven gears 57 to 61 on the transmission output shaft 48 is coupled to the shaft 48 through the associated synchronizer clutch 64, 65 or 66 or the reverse idler gear 63 is brought into mesh with the reverse drive gear 56 and the synchronizer clutch 64, the driving power carried through the clutch unit 42 to the transmission input shaft 47 is transmitted to the transmission output shaft 48 through the selected pair of gears on the shafts 47 and 48 or through the gears 56 and 63. The rotation of the transmission output shaft 48 thus driven for rotation at a speed proportioned in the selected ratio to the rotational speed of the transmission input shaft 47 is transmitted through the transmission output gear 67 on the shaft 48 to the power transfer gear 68 of the front-wheel drive unit 44. The rotation of the power transfer gear 68 in turn is transmitted to the sun gear 73 of the planetary gear assembly 72 through the engagement between the respective axial extensions of the power transfer gear 68 and the sun gear 73. The sun gear 73 is driven for rotation about the axis thereof and causes the individual planet pinions 75 to rotate with respect to the pinion carrier 76 about the respective center axes thereof and accordingly revolve with respect to the transaxle casing 46 around their common axis of rotation coincident with the axis of rotation of the sun gear 73.

If, in this instance, the coupling sleeve 82 of the low- and-high speed shifting clutch means 78 is held in the axial position engaging the externally serrated annular member 79 on the axial extension of the power transfer gear 68, the power transfer gear 68 is drivingly connected not only to the sun gear 73 as above described but also to the ring gear 74 of the planetary gear assembly 72 through the annular member 79, the coupling sleeve 82 and the sleeve carrier member 81 on the axial extension of the ring gear 74. Under these conditions, the sun gear 73, ring gear 74, planet pinions 75 and pinion carrier 76 are driven for rotation as a single unit about the center axis of the sun gear 73. The pinion carrier 76 of the planetary gear assembly 72 is therefore driven for rotation about the center axis of the sun gear 73 at a speed equal to the revolution speed of the power transfer gear 68. If, however, the coupling sleeve 82 of the low-and-high speed shifting clutch means 78 is held in the axial position engaging the externally serrated annular portion 80a of the reaction member 80 secured to the transaxle casing 46, the sleeve carrier member 81 and accordingly the ring gear 74 of the planetary gear assembly 72 are locked up to the transaxle casing 46 so that the ring gear 74 is held at a standstill. Under these conditions, the pinion carrier 76 is driven for rotation about the center axis of the sun gear 73 at a speed lower than and proportional to the revolution speed of the power transfer gear 68 as is well known in the art. Driving power is thus transmitted through the planetary gear assembly 72 at two different speeds depending upon the axial positions of the coupling sleeve 82 with respect to the annular member 79 on the axial extension of the power transfer gear 68 and the reaction member 80 secured to the transaxle casing 46.

The driving power thus transmitted to the pinion carrier 76 of the planetary gear assembly 72 is split into two output components respectively driving the differential casing 84 of the differential gear assembly 83 and the driving bevel gear 92 forming part of the rear-wheel drive unit 45. The driving power is transmitted from the pinion carrier 76 to the differential gear casing 84 and through the gear casing 84 and the cross shaft 87 to the differential bevel pinions 86. The differential bevel pinions 86 in turn drive the differential side bevel gears 88 and 88' for rotation with respect to the gear casing 84 about an axis at right angles to the center axis of the cross shaft 87. Thus, the driving power transmitted to the front-wheel differential gear assembly 44 is further split into two output components, which are respectively transmitted through the side gear shafts 70 and 70' and front-wheel drive shafts 89 and 89' to the wheel axles for the front road wheels 90 and 90', respectively.

On the other hand, the driving power transmitted from the pinion carrier 76 to the driving bevel gear 92 of the rear-wheel drive unit 45 is transmitted to the driven bevel gear 93 of the unit 45 and drives the bevel gear 93 for rotation about its axis in a fore-and-aft direction of the vehicle body. If, now, the coupling sleeve 97 of the two-wheel/four-wheel drive shifting means 96 is held in the axial position engaging the serrated front end portion 95a of the propeller shaft 95, the the driven bevel gear 93 is held in driving engagement with the propeller shaft 95 through the coupling sleeve 97. The driving power transmitted to the pinion carrier 76 of the planetary gear assembly 72 is, thus, carried not only to the differential gear assembly 83 as above described but also to the propeller shaft 95 through the driving and driven bevel gears 92 and 93 and the coupling sleeve 97. The driving power transmitted to the propeller shaft 95 is carried to the rear-wheel differential gear assembly 98 and is further split by the gear assembly 98 into two driving power components respectively driving the rear-wheel drive shafts. The drive axles for the rear road wheels 91 and 91' are thus also driven for rotation about the respective axes thereof. In this instance, both the pair of front road wheels 90 and 90' and the pair of rear road wheels 91 and 91' are driven for rotation so that the vehicle operates in four-wheel driven conditions. If, however, the coupling sleeve 97 is held in the axial position disengaged from the serrated front end portion 95a of the propeller shaft 95, the propeller shaft 95 is disengaged from the driven bevel gear 93. The propeller shaft 95 is as a consequence isolated from the driving power transmitted to the driven bevel gear 93, which is thus caused to merely idle together with the driving bevel gear 92. In this instance, only the front road wheels 90 and 90' are driven for rotation so that the vehicle operates in two-wheel driven conditions.

Figure 4:
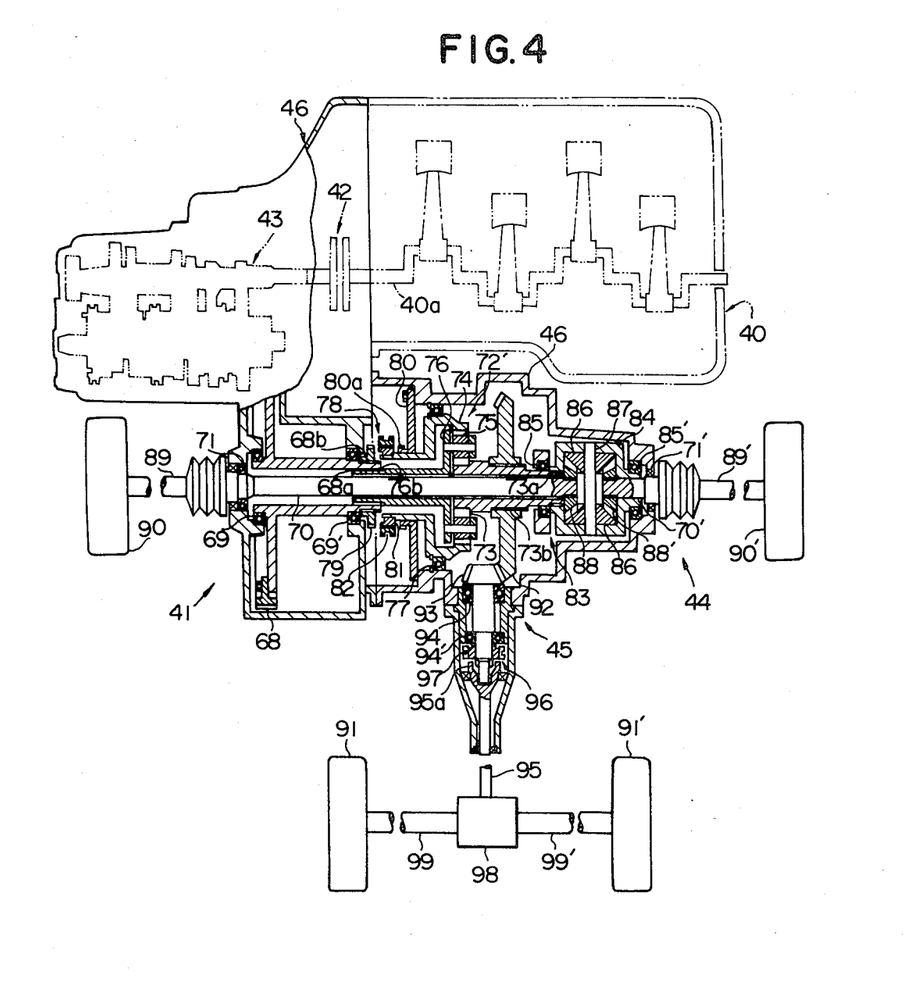
FIG. 4 is a view similar to FIG. 2 but showing a second embodiment of the four-wheel drive system according to the present invention.

The second embodiment of a four-wheel drive system according to the present invention as shown in FIG. 4 is characterized simply and solely by modified arrangement of the planetary gear assembly.

The embodiment herein shown is constructed and arranged similarly in other respects to the embodiment hereinbefore described with reference to FIGS. 2 and 3.

In contrast to the planetary gear assembly 72 in the embodiment of FIG. 2 in which the sun gear 73 and pinion carrier 76 are used respectively as the input and output members, the input and output members of the planetary gear assembly, now designated in its entirety by 72', in the embodiment of FIG. 4 are constituted conversely by the pinion carrier 76 and sun gear 73, respectively, of the planetary gear assembly 72'. For this purpose, the pinion carrier 76 of the planetary gear assembly 72' has a hollow axial extension passing the side shaft 70 axially therethrough and having a serrated outer peripheral portion 76b. The serrated outer peripheral portion 76b of the pinion carrier 76 is splined to the serrated inner peripheral portion 68a of the axial extension of the power transfer gear 68 so that the pinion carrier 76 is rotatable together with the power transfer gear 68 about the center axis of the side gear shaft 70. The ring gear 74 of the planetary gear assembly 72' also has a hollow axial extension which coaxially surrounds the above mentioned axial extension of the pinion carrier 76 and which axially extends toward the axial extension of the power transfer gear 68 as shown. Furthermore, the sun gear 73 of the planetary gear assembly 72' has a hollow axial extension having a serrated outer peripheral portion 73b and coaxially surrounding an axial portion of the side gear shaft 70. The driving bevel gear 92 forming part of the rear-wheel drive unit 45 is splined to the serrated outer peripheral portion 73b of the sun gear 73 and is thus rotatable with the sun gear 73 about the center axis of the side gear shaft 70. The low-and-high speed shifting clutch means 78 intervening between the power transfer gear 68 and the planetary gear assembly 72' thus arranged is per se similar to the counterpart thereof in the embodiment shown in FIG. 2.

When, in operation, driving power is delivered from the output gear 67 on the transmission output shaft 48 (FIG. 3), the driving power is transmitted to the power transfer gear 68 of the front-wheel drive unit 44. The rotation of the power transfer gear 68 in turn is transmitted to the pinion carrier 76 of the planetary gear assembly 72' through the engagement between the respective axial extensions of the power transfer gear 68 and the pinion carrier 76. The pinion carrier 76 of the planetary gear assembly 72' is therefore driven for rotation about the center axis of the sun gear 73 and causes the individual planet pinions 75 to revolve with respect to the transaxle casing 46 around their common axis of rotation coincident with the axis of rotation of the pinion carrier 76 and accordingly rotate with respect to the pinion carrier 76 about the respective center axes thereof.

If, in this instance, the coupling sleeve 82 of the low-and-high speed shifting clutch means 78 is held in the axial position engaging the externally serrated annular member 79 on the axial extension of the power transfer gear 68, the power transfer gear 68 is drivingly connected not only to the pinion carrier 76 as above described but also to the ring gear 74 of the planetary gear assembly 72' through the annular member 79, the coupling sleeve 82 and the sleeve carrier member 81 on the axial extension of the ring gear 74. Under these conditions, the sun gear 73, ring gear 74, planet pinions 75 and pinion carrier 76 are also driven for rotation as a single unit about the center axis of the sun gear 73. The sun gear 73 of the planetary gear assembly 72' is therefore driven for rotation about the center axis thereof at a speed equal to the revolution speed of the power transfer gear 68. If, however, the coupling sleeve 82 is held in the axial position engaging the externally serrated annular portion 80a of the reaction member 80, the sleeve carrier member 81 and accordingly the ring gear 74 of the planetary gear assembly 72' are locked up to the transaxle casing 46 so that the ring gear 74 is held at a standstill. Under these conditions, the sun gear 73 is driven for rotation at a speed lower than and proportional to the revolution speed of the power transfer gear 68 as is well known in the art. The low-and-high speed shifting clutch means 78 in the four-wheel drive system shown in FIG. 4 is in these manners operable similarly to the counterpart thereof in the embodiment of FIG. 2 and is capable of transmitting driving power through the planetary gear assembly 72' at two different speeds depending upon the axial positions of the coupling sleeve 82 with respect to the annular member 79 and the reaction member 80. The driving power thus transmitted to the sun gear 73 of the planetary gear assembly 72' is split into two output components respectively driving the differential casing 84 of the differential gear assembly 83 and the driving bevel gear 92 of the rear-wheel drive unit 45 as in the embodiment of FIG. 2.

Figure 5:
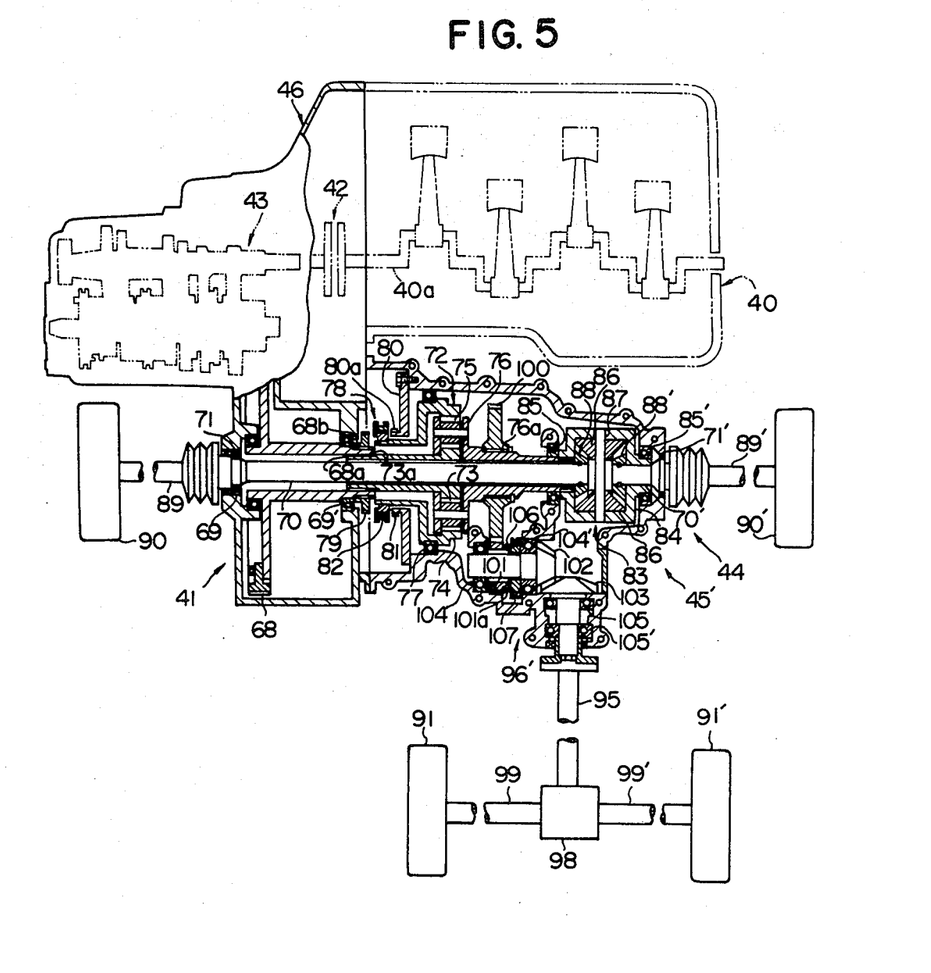
FIG. 5 is a view also similar to FIG. 2 but showing a third embodiment of the system according to the present invention.

The third embodiment of a four-wheel drive system according to the present invention as shown in FIG. 5 features a modified form of rear-wheel drive unit which is now designated by 45'. The embodiment herein shown is also constructed and arranged similarly in other respects to the embodiment hereinbefore described with reference to FIGS. 2 and 3.

In the embodiment shown in FIG. 5, the rear-wheel drive unit 45' is also enclosed within a rear extension of the transaxle casing 46 and is composed of the combination of externally toothed driving and driven spur gears 100 and 101 and the combination of driving and driven bevel gears 102 and 103. The driving spur gear 100 has a serrated inner peripheral wall splined to the serrated outer peripheral portion 76a of the axial extension of the pinion carrier 76 and is thus rotatable with the pinion carrier 76 about the center axis of the side gear shaft 70. The driving bevel gear 102 has an axial extension extending in parallel with the side gear shaft 70 and accordingly in a lateral direction of the vehicle body and journaled in bearings 104 and 104' received in the transaxle casing 46. The driven spur gear 101 is rotatable on the axial extension of the driving bevel gear 102 and is held in mesh with the driving spur gear 100 as shown. On the other hand, the driven bevel gear 103 is held in mesh with the driving bevel gear 102 and has a rearward axial extension journaled in bearings 105 and 105' received in the rear extension of the transaxle casing 46. The driven bevel gear 103 is rotatable about an axis extending at right angles to the axis of rotation of the driven spur gear 101, viz., in a fore-and-aft direction of the vehicle body. The combination of the driving and driven bevel gears 102 and 103 in the rear-wheel drive unit 45' constitutes right-angle power transfer gear means similar to its counterpart constituted by the combination of the bevel gears 92 and 93 in the rear-wheel drive unit 45 of the embodiment of FIG. 2. Similar to the driven bevel gear 93 of the rear-wheel drive unit 45 in the embodiment of FIG. 2, furthermore, the axial extension of the driven bevel gear 103 projects rearwardly from the rear extension of the transaxle casing 46 through an opening formed in the extension for connection to the propeller shaft 95 also extending rearwardly from the gear 103 in a fore-and-aft direction of the vehicle body.

The driven spur gear 101 is selectively brought into and out of driving engagement with the driving bevel gear 102 by two-wheel/four-wheel drive shifting clutch means 96'. The clutch means 96' comprises at least three clutch elements consisting of a first clutch element rotatable with the driven spur gear 101, a second clutch element rotatable with the driving bevel gear 102 and a third clutch element rotatable with one of the first and second clutch elements and selectively movable into and out of engagement with the other of the first and second clutch elements. In the arrangement shown in FIG. 5, the driven spur gear 101 has an externally serrated annular portion 101a while the axial extension of the driving bevel gear 102 has fixedly carried thereon an externally serrated annular sleeve carrier 106. The serrated annular portion 101a of the spur gear 101 and the serrated sleeve carrier 106 constitute the first and second clutch elements, respectively, of the clutch means 96'. On the other hand, the third clutch element of the clutch means 96' is constituted by an internally serrated coupling sleeve 107 which is splined to the serrated sleeve carrier 106. The coupling sleeve 107 is axially movable on the sleeve carrier 106 in a first direction into mating engagement with the serrated annular portion 101a of the driven spur gear 101 and in a second direction out of engagement with the portion 101a.

In operation, driving power is transmitted from the pinion carrier 76 of the planetary gear assembly 72 to the driving spur gear 100 of the rear-wheel drive unit 45 and through the spur gear 100 further to the driven spur gear 101, driving the spur gear 101 for rotation about its axis parallel with the axis of rotation of the driving spur gear 100. If the coupling sleeve 107 of the two-wheel/four-wheel drive shifting means 96' is held in the axial position engaging the serrated annular portion 101a of the driven spur gear 101, the the driven spur gear 101 is held in driving engagement with the driving bevel gear 102 through the coupling sleeve 107. The driving power transmitted to the pinion carrier 76 of the planetary gear assembly 72 is, thus, carried not only to the front-wheel differential gear assembly 83 but to the propeller shaft 95 through the spur gears 100 and 101, coupling sleeve 107 and bevel gears 102 and 103. Thus, the pair of front road wheels 90 and 90' and the pair of rear road wheels 91 and 91' are driven for rotation so that the vehicle operates in four-wheel driven conditions. If, however, the coupling sleeve 107 is held in the axial position disengaged from the annular portion 101a of the driven spur gear 101, the propeller shaft 95 is disengaged from the driven spur gear 101. The propeller shaft 95 is as a consequence isolated from the driving power transmitted to the driven spur gear 101, which is thus caused to merely idle together with the driving spur gear 100. In this instance, only the pair of front road wheels 90 and 90' are driven for rotation so that the vehicle operates in two-wheel driven conditions.

Figure 6:
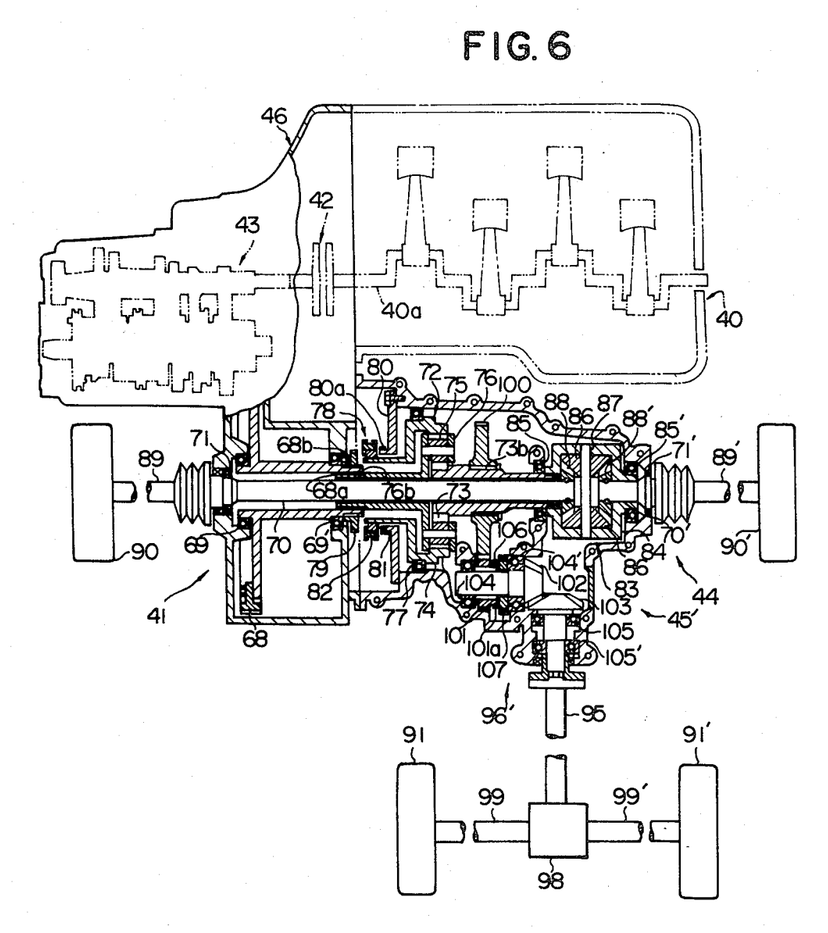
FIG. 6 is a view also similar to FIG. 2 but showing a fourth embodiment of the system according to the present invention.

The fourth embodiment of a four-wheel drive system according to the present invention as shown in FIG. 6 is characterized simply and solely by a modified arrangement of the planetary gear assembly.

The embodiment herein shown is constructed and arranged similarly in other respects to the embodiment hereinbefore described with reference to FIGS. 3 and 5.

In constrast to the planetary gear assembly 72 in the embodiment of FIG. 5 in which the sun gear 73 and pinion carrier 76 are used respectively as the input and output members, the input and output members of the planetary gear assembly, now designated in its entirety by 72', in the embodiment of FIG. 6 are constituted conversely by the pinion carrier 76 and sun gear 73, respectively, of the planetary gear assembly 72'. For this purpose, the pinion carrier 76 of the planetary gear assembly 72' has a hollow axial extension passing the side shaft 70 axially therethrough and having a serrated outer peripheral portion 76b. The serrated outer peripheral portion 76b of the pinion carrier 76 is splined to the serrated inner peripheral portion 68a of the axial extension of the power transfer gear 68 so that the pinion carrier 76 is rotatable together with the power transfer gear 68 about the center axis of the side gear shaft 70. The ring gear 74 of the planetary gear assembly 72' also has a hollow axial extension which coaxially surrounds the above mentioned axial extension of the pinion carrier 76 and which axially extends toward the axial extension of the power transfer gear 68 as shown. Furthermore, the sun gear 73 of the planetary gear assembly 72' has a hollow axial extension having a serrated outer peripheral portion 73b and coaxially surrounding an axial portion of the side gear shaft 70. The driving spur gear 100 forming part of the rear-wheel drive unit 45' is splined to the serrated outer peripheral portion 73b of the sun gear 73 and is thus rotatable with the sun gear 73 about the center axis of the side gear shaft 70. The low-and-high speed shifting clutch means 78 intervening between the power transfer gear 68 and the planetary gear assembly 72' thus arranged is per se similar to the counterpart thereof in the embodiment shown in FIG. 2.

In the embodiment shown in FIG. 6, the rear-wheel drive unit 45' is also enclosed within a rear extension of the transaxle casing 46 and is composed of the combination of externally toothed driving and driven spur gears 100 and 101 and the combination of driving and driven bevel gears 102 and 103. The driving bevel gear 102 has an axial extension extending in parallel with the side gear shaft 70 and accordingly in a lateral direction of the vehicle body and journaled in bearings 104 and 104' received in the transaxle casing 46. The driven spur gear 101 is rotatable on the axial extension of the driving bevel gear 102 and is held in mesh with the driving spur gear 100 as shown. On the other hand, the driven bevel gear 103 is held in mesh with the driving bevel gear 102 and has a rearward axial extension journaled in bearings 105 and 105' received in the rear extension of the transaxle casing 46. The driven bevel gear 103 is rotatable about an axis extending at right angles to the axis of rotation of the driven spur gear 101, viz., in a fore-and-aft direction of the vehicle body. The combination of the driving and driven bevel gears 102 and 103 in the rear-wheel drive unit 45' constitutes right-angle power transfer gear means similar to its counterpart constituted by the combination of the bevel gears 92 and 93 in the rear-wheel drive unit 45 of the embodiment of FIG. 2. Similar to the driven bevel gear 93 of the rear-wheel drive unit 45 in the embodiment of FIG. 2, furthermore, the axial extension of the driven bevel gear 103 projects rearwardly from the rear extension of the transaxle casing 46 through an opening formed in the extension for connection to the propeller shaft 95 also extending rearwardly from the gear 103 in a fore-and-aft direction of the vehicle body.

The driven spur gear 101 is selectively brought into and out of driving engagement with the driving bevel gear 102 by two-wheel/four-wheel drive shifting clutch means 96'. The clutch means 96' comprises at least three clutch elements consisting of a first clutch element rotatable with the driven spur gear 101, a second clutch element rotatable with the driving bevel gear 102 and a third clutch element rotatable with one of the first and second clutch elements and selectively movable into and out of engagement with the other of the first and second clutch elements. In the arrangement shown in FIG. 5, the driven spur gear 101 has an externally serrated annular portion 101a while the axial extension of the driving bevel gear 102 has fixedly carried thereon an externally serrated annular sleeve carrier 106. The serrated annular portion 101a of the spur gear 101 and the serrated sleeve carrier 106 consitute the first and second clutch elements, respectively, of the clutch means 96'. On the other hand, the third clutch element of the clutch means 96' is constituted by an internally serrated coupling sleeve 107 which is splined to the serrated sleeve carrier 106. The coupling sleeve 107 is axially movable on the sleeve carrier 106 in a first direction into mating engagement with the serrated annular portion 101a of the driven spur gear 101 and in a second direction out of engagement with the portion 101a.

When, in operation, driving power is delivered from the output gear 67 on the transmission output shaft 48 (FIG. 3), the driving power is transmitted to the power transfer gear 68 of the front-wheel drive unit 44. The rotation of the power transfer gear 68 in turn is transmitted to the pinion carrier 76 of the planetary gear assembly 72' through the engagement between the respective axial extensions of the power transfer gear 68 and the pinion carrier 76. The pinion carrier 76 of the planetary gear assembly 72' is therefore driven for rotation about the center axis of the sun gear 73 and causes the individual planet pinions 75 to revolve with respect to the transaxle casing 46 around their common axis of rotation coincident with the axis of rotation of the pinion carrier 76 and accordingly rotate with respect to the pinion carrier 76 about the respective center axes thereof.

If, in this instance, the coupling sleeve 82 of the low-and-high speed shifting clutch means 78 is held in the axial position engaging the externally serrated annular member 79 on the axial extension of the power transfer gear 68, the power transfer gear 68 is drivingly connected not only to the pinion carrier 76 as above described but also to the ring gear 74 of the planetary gear assembly 72' through the annular member 79, the coupling sleeve 82 and the sleeve carrier member 81 on the axial extension of the ring gear 74. Under these conditions, the sun gear 73, ring gear 74, planet pinions 75 and pinion carrier 76 are also driven for rotation as a single unit about the center axis of the sun gear 73. The sun gear 73 of the planetary gear assembly 72' is therefore driven for rotation about the center axis thereof at a speed equal to the revolution speed of the power transfer gear 68. If, however, the coupling sleeve 82 is held in the axial position engaging the externally serrated annular portion 80a of the reaction member 80, the sleeve carrier member 81 and accordingly the ring gear 74 of the planetary gear assembly 72' are locked up to the transaxle casing 46 so that the ring gear 74 is held at a standstill. Under these conditions, the sun gear 73 is driven for rotation at a speed lower than and proportional to the revolution speed of the power transfer gear 68 as is well known in the art. The low-and-high speed shifting clutch means 78 in the four-wheel drive system shown in FIG. 6 is in these manners operable similarly to the counterpart thereof in the embodiment of FIG. 2 and is capable of transmitting driving power through the planetary gear assembly 72' at two different speeds depending upon the axial positions of the coupling sleeve 82 with respect to the annular member 79 and the reaction member 80. The driving power thus transmitted to the sun gear 73 of the planetary gear assembly 72' is split into two output components respectively driving the differential casing 84 of the differential gear assembly 83 and the driving spur gear 100 of the rear-wheel drive unit 45' as in the embodiment of FIG. 5.

While the internal combustion engine 40 in each of the embodiments thus far described is shown positioned to the right of the transmission gear unit 43, this is merely for the purpose of illustration and, thus, has no significance in a four-wheel drive system according to the present invention. If, however, the engine included in a four-wheel drive system according to the present invention is positioned to the left of the transmission gear unit 43, it is preferable that the rotatable members of the planetary gear assembly be arranged in such a manner that the respective directions of rotation thereof are inverse to those of the rotary members of the planetary gear assembly 72 or 72' in each of the embodiments hereinbefore described. For this purpose, the ring gear and pinion carrier, for example, of such a planetary gear assembly may be arranged to act as an output member and a reaction member, respectively. Such arrangement of the planetary gear assembly permits positioning of the engine to the left of the transmission gear unit 43 without having recourse to a reversal of the direction of rotation of the engine output shaft or to addition of an idler shaft to the transmission gear unit 43.

While it has been described about the fact that the sun gear 73 and pinion carrier 76 are selectively used respectively as the input and output members and respectively as the output and input members in the planetary gear assemblies 72 and 72' in the embodiments of FIGS. 2, 4, 5 and 6, the ring gear 74 may be used as one of the input and output members while one of the sun gear 73 and pinion carrier 76 may be used as the other of the input and output members according to the present invention. Furthermore, one of the sun gear 73 and the pinion carrier 76 may be used as part of the low-and-high speed shifting clutch means coupling selectively between the reaction member 80 and one of the sun gear 73 and pinion carrier 76.

What is claimed is:

1. A fourwheel drive system for a vehicle having at least first and second pairs of road wheels, comprising a power unit having an output shaft rotatable about an axis in a lateral direction of the vehicle;

a power transmission gear unit including transmission input and output shafts each having an axis of rotation parallel with an extension of the axis of rotation of the output shaft of said power unit;

a power transfer gear rotatable about an axis parallel with the respective axes of rotation of the transmission input and output shafts, the transmission output shaft being held in driving engagement with the power transfer gear;

a first wheel drive unit comprising a differential gear assembly for the first pair of road wheels; and a planetary gear assembly including at least first, second and third rotary members having a common axis of rotation aligned with the axis of rotation of said power transfer gear, each of the rotary members being constituted by any of an externally toothed sun gear, an internally toothed gear coaxially encircling the sun gear and a pinion carrier carrying at least one planet pinion gear held in mesh with sun gear and the ring gear and rotatable with respect to the pinion carrier about an axis parallel with said common axis, said power transfer gear being in driving engagement with the first rotary member of the planetary gear assembly, the second rotary member of the planetary gear assembly being held in driving engagement with said differential gear assembly;

low-and-high speed shifting clutch means adapted to provide coupling selectively between said power transfer gear and the third rotary member of the planetary gear assembly and between the third rotary member and a stationary member fixed in the vehicle;

a second wheel drive unit comprising right-angle power transfer gear means including a driving gear which is rotatable about an axis aligned with said common axis of rotation of said rotary members and which is located axially between said planetary gear assembly and said differential gear assembly transversely of the vehicle, said second rotary member being further in driving engagement with said driving gear so that the driving power transmitted to the second rotary member is split into two driving power components, one of which is to be carried to said differential gear assembly and the other of which is to be carried to the driving gear of said right-angle power transfer gear means, the right-angle power transfer gear means further including a driven gear rotatable about an axis in a fore-and-aft direction of the vehicle and operatively engaged with said driving gear;

a driveline operatively intervening between said driven gear and said second pair of road wheels; and two-wheel/four-wheel drive shifting means intervening between said driven gear and said driveline and operative to selectively provide coupling therebetween.

2. A four-wheel drive system as set forth in claim 1, in which said first rotary member is constituted by one of the sun gear and the pinion carrier of said planetary gear assembly and said second rotary member is constituted by the other of the sun gear and the pinion carrier of the planetary gear assembly, said third rotary member being constituted by the ring gear of said planetary gear assembly.

3. A four-wheel drive system as set forth in claim 2, in which said first and second rotary members are constituted by the sun gear and the pinion carrier, respectively, of said planetary gear assembly.

4. A four-wheel drive system as set forth in claim 2, in which said first and second rotary members are constituted by the pinion carrier and the sun gear, respectively, of said planetary gear assembly.

5. A four-wheel drive system as set forth in any one of claims 1 to 4, in which said low-and-high speed shifting clutch means comprises a first clutch element rotatable with said power transfer gear, a second clutch element stationary with respect to said stationary member, and a third clutch element rotatable with the third rotary member of said planetary gear assembly and movable in a first direction into engagement with the first clutch element and in a second direction into engagement with the second clutch element.

6. A four-wheel drive system as set forth in any one of claims 1 to 4, in which said driving gear of said right-angle power transfer gear means is constituted by a driving bevel gear, wherein said driven gear is constituted by a driven bevel gear which is held in mesh with said driving bevel gear.

7. A four-wheel drive system as set forth in claim 6, in which said driveline comprises a propeller shaft rotatable about an axis in a fore-and-aft direction of the vehicle and having an axial end portion located adjacent said driven gear, said two-wheel/four-wheel drive shifting means comprising a first clutch element rotatable with said driven bevel gear, a second clutch element rotatable with said propeller shaft, and a third clutch element rotatable with one of the first and second clutch elements and movable into and out of engagement with the other of the first and second clutch elements.

8. A four-wheel drive system as set forth in any one of claims 1 to 4, in which said right-angle power transfer gear means is constituted by a driving spur gear, said right-angle power transfer gear means further including a driven spur gear which is rotatable about an axis parallel with the axis of rotation of said driving spur gear and which is in mesh with the driving spur gear, a driving bevel gear rotatable about an axis parallel with said driving spur gear, and a driven bevel gear constituting said driven gear and held in mesh with said driving bevel gear.

9. A four-wheel drive system as set forth in claim 8, in which said driven spur gear is coaxially rotatable with respect to said driving bevel gear and in which said two-wheel/four-wheel drive shifting means comprises a first clutch element rotatable with said driven spur gear, a second clutch element rotatable with said driving bevel gear, and a third clutch element rotatable with one of the first and second clutch elements and movable into and out of engagement with the other of the first and second clutch elements.

10. A four-wheel drive system as set forth in any one of claims 1 to 4, in which said low-and-high speed shifting clutch means is located axially between said power transfer gear and said planetary gear assembly transversely of the vehicle.

* * * * *